(12) United States Patent
Ahern et al.

(10) Patent No.: US 11,093,834 B2
(45) Date of Patent: Aug. 17, 2021

(54) COMPUTER-IMPLEMENTED SYSTEM AND METHOD FOR PREDICTING ACTIVITY OUTCOME BASED ON USER ATTENTION

(71) Applicant: Palo Alto Research Center Incorporated, Palo Alto, CA (US)

(72) Inventors: Shane Ahern, Foster City, CA (US);
Michael Roberts, Los Gatos, CA (US);
Simon Tucker, Oakland, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1173 days.

(21) Appl. No.: 15/203,740

(22) Filed: Jul. 6, 2016

(65) Prior Publication Data
US 2018/0012126 A1  Jan. 11, 2018

(51) Int. Cl.
| G06N 5/02 | (2006.01) |
| H04L 29/08 | (2006.01) |
| H04W 4/02 | (2018.01) |
| H04W 4/80 | (2018.01) |
| G06N 5/04 | (2006.01) |

(52) U.S. Cl.
CPC ................. *G06N 5/02* (2013.01); *G06N 5/04* (2013.01); *H04L 67/02* (2013.01); *H04L 67/22* (2013.01); *H04W 4/023* (2013.01); *H04W 4/80* (2018.02)

(58) Field of Classification Search
CPC . G06N 5/02; G06N 5/04; H04L 67/02; H04L 67/22; H04W 4/023; H04W 4/80
See application file for complete search history.

(56) References Cited

U.S. PATENT DOCUMENTS

| 7,743,050 B1 | 6/2010 | Bern et al. |
| 7,885,844 B1 | 2/2011 | Cohen et al. |
| 8,554,703 B1 | 10/2013 | Lin et al. |
| 8,868,472 B1 | 10/2014 | Lin et al. |
| 9,256,785 B2 | 2/2016 | Qvarfordt |
| 9,280,911 B2 | 3/2016 | Sadeh-Koniecpol |
| 9,374,434 B2 | 6/2016 | Sylvain |
| 9,589,560 B1 | 3/2017 | Vitaladevuni et al. |
| 9,906,539 B2 | 2/2018 | Higbee et al. |
| 10,330,440 B2 | 6/2019 | Lyren |

(Continued)

FOREIGN PATENT DOCUMENTS

EP   1850134   10/2007

OTHER PUBLICATIONS

Rello et al., "Detecting Readers with Dyslexia Using Machine Learning with Eye Tracking Measures", May 18-20, 2015, W4A '15 Proceedings of the 12th Web for All Conference, pp. 1-8 (Year: 2015).*

(Continued)

*Primary Examiner* — Kamran Afshar
*Assistant Examiner* — Brent Johnston Hoover
(74) *Attorney, Agent, or Firm* — Krista A. Wittman

(57) ABSTRACT

A computer-implemented system and method for predicting activity outcome based on user attention is provided. Sensor data is collected for a user, and an activity performed by a user is identified based on the sensor data. Features of the user are collected while performing the activity and a subject of focus of the user is determined based on the collected features. An outcome of the activity performed by the user is predicted based on the features and the determined subject of focus.

14 Claims, 4 Drawing Sheets

(56) References Cited

U.S. PATENT DOCUMENTS

| | | | |
|---|---|---|---|
| 2003/0065731 A1* | 4/2003 | Mohammed | G06F 21/33 709/208 |
| 2006/0109237 A1* | 5/2006 | Morita | G06F 3/013 345/156 |
| 2007/0260596 A1 | 11/2007 | Koran et al. | |
| 2008/0294617 A1 | 11/2008 | Chakrabarti et al. | |
| 2009/0077057 A1 | 3/2009 | Ducheneaut et al. | |
| 2010/0241464 A1 | 9/2010 | Amigo et al. | |
| 2011/0125678 A1* | 5/2011 | Partridge | G06Q 30/02 706/12 |
| 2011/0302169 A1 | 12/2011 | Brdiczka et al. | |
| 2012/0041969 A1 | 2/2012 | Priyadarshan et al. | |
| 2012/0257733 A1 | 10/2012 | Kosseifi et al. | |
| 2012/0310587 A1 | 12/2012 | Tu et al. | |
| 2013/0009993 A1 | 1/2013 | Horseman | |
| 2013/0262216 A1 | 10/2013 | Zhang et al. | |
| 2013/0271454 A1* | 10/2013 | Lyons | G06T 11/60 345/419 |
| 2013/0325970 A1 | 12/2013 | Roberts et al. | |
| 2014/0257540 A1 | 9/2014 | Pacione et al. | |
| 2014/0280208 A1 | 9/2014 | McConky et al. | |
| 2014/0282257 A1 | 9/2014 | Nixon et al. | |
| 2015/0131850 A1* | 5/2015 | Qvarfordt | G06F 3/013 382/103 |
| 2015/0134612 A1 | 5/2015 | Silberstein | |
| 2015/0193695 A1 | 7/2015 | Cruz Mota et al. | |
| 2015/0324686 A1 | 11/2015 | Julian et al. | |
| 2016/0093154 A1 | 3/2016 | Bytnar et al. | |
| 2016/0119364 A1 | 4/2016 | Zolli | |
| 2016/0140481 A1 | 5/2016 | Huang et al. | |
| 2016/0142435 A1 | 5/2016 | Bernstein et al. | |
| 2016/0283887 A1 | 9/2016 | Jagyasi et al. | |
| 2016/0314627 A1 | 10/2016 | Fish et al. | |
| 2016/0321616 A1 | 11/2016 | Gedge et al. | |
| 2016/0358065 A1 | 12/2016 | Gedge et al. | |
| 2016/0359993 A1 | 12/2016 | Hendrickson et al. | |
| 2016/0379136 A1 | 12/2016 | Chen et al. | |
| 2017/0032248 A1 | 2/2017 | Dotan-Cohen et al. | |
| 2017/0126963 A1* | 5/2017 | Todasco | H04N 5/23222 |
| 2017/0140285 A1 | 5/2017 | Dotan-Cohen et al. | |
| 2017/0163503 A1 | 6/2017 | Black | |
| 2017/0177833 A1 | 6/2017 | Lewallen et al. | |
| 2017/0178024 A1 | 6/2017 | Kida | |
| 2017/0187807 A1* | 6/2017 | Clernon | H04W 4/70 |
| 2017/0279827 A1 | 9/2017 | Savalle et al. | |
| 2017/0289769 A1 | 10/2017 | Ceker et al. | |
| 2017/0309196 A1 | 10/2017 | Vangala et al. | |

OTHER PUBLICATIONS

Eivazi et al., "Predicting Problem-Solving Behavior and Performance Levels from Visual Attention Data", Feb. 13, 2012, 2nd Workshop on Eye Gaze in Intelligent Human Machine Interaction, pp. 9-16 (Year: 2012).*

Ratwani et al., "A Real-Time Eye Tracking System for Predicting and Preventing Postcompletion Errors", Human-Computer Interaction, 2011, vol. 26, pp. 205-245 (Year: 2011).*

Hastie et al., "Automatic Evaluation: Using a DATE Dialogue Act Tagger for User Satisfaction and Task Completion Prediction", 2002, Proc. Lang. Resources Eval. Conf, pp. 1-8 (Year: 2002).*

Vo, C.C., Torabi, T., Loke, S.W. (2009). "Towards Context-Aware Task Recommendation," 2009 Joint Conferences on Pervasive Computing (JCPC). doi:10.1109/jcpc.2009.5420173 (Year: 2009).

* cited by examiner

COMPUTER-IMPLEMENTED SYSTEM AND METHOD FOR PREDICTING ACTIVITY OUTCOME BASED ON USER ATTENTION

FIELD

This application relates in general to monitoring context, and in particular to a computer-implemented system and method for predicting activity outcome based on user attention.

BACKGROUND

Often times, during the servicing or maintenance of a machine, a service provider may run into a problem with which he is not familiar and may require assistance to solve. In this type of situation, the service provider may need to consult an instruction manual, look for advice via the Internet, or call a different service provider to complete the servicing. Unfortunately, such actions require time and thus, increase the overall time for completing the servicing. The increased time for completion can result in a decrease in customer satisfaction and a potential loss of customers.

Preventing such unexpected problems is difficult because the service provider must first begin work on the object before a problem or need is encountered. For example, a cable repair technician is sent to a residence to fix a non-working Internet connection. However, the cable repair technician does not know what problems he will encounter until he attempts to repair the Internet connection. After attempting all known solutions and the Internet connection remains non-working, the repair technician may need additional help. Alternatively, the repair technician can identify the problem, but does not know how to fix the problem.

Existing technologies, such as machine understanding of human attention, fail to adequately address challenges of anticipating and preventing unexpected delay during service provisioning. Specifically, current means for machine understanding focuses on interaction with documents, gaze detection using cameras to observe a user's eye, or video analysis, which attempts to predict the probability of particular features of a video stream being the subject of a viewer's attention.

Therefore, there is a need for an approach to anticipating a need of a user during performance of a service and providing relevant recommendations or advice to fulfil the need to ensure that the service is successfully and timely completed. Preferably, any need of the user is identified by predicting an outcome of the service based on a subject of focus by the user during the service provisioning.

SUMMARY

To ensure that a service is timely completed, unexpected problems and need for assistance can be predicted based on an identified activity being performed by a service provider and a subject of focus by the service provider during the activity. Specifically, upon identifying the performed activity, a connection between the service provider and a remote expert is made such that the remote expert can provide assistance to the service provider. During this connection, actions of the service provider are monitored to determine the service provider's subject of focus. Based on the determined focus subject, an outcome for completion of the service is determined and assistance, if necessary, can be provided to the service provider based on the predicted outcome.

An embodiment provides a computer-implemented system and method for predicting activity outcome based on user attention. Sensor data is collected for a user, and an activity performed by a user is identified based on the sensor data. Features of the user are collected while performing the activity and a subject of focus of the user is determined based on the collected features. An outcome of the activity performed by the user is predicted based on the features and the determined subject of focus.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

While performing a service for a customer, a service provider may run into unexpected problems or require assistance to complete the servicing. However, such problems or unexpected need for assistance increase the time for completing the service. The increased time for completion may then cause customer dissatisfaction and a potential loss of customers. To ensure that servicing is timely completed despite any unforeseen complications, an action being performed by the service provider during servicing is identified and a subject of focus of the service provider is determined. Subsequently, a prediction is made as to whether or not the service will be successfully completed. If an unsuccessful prediction is made, assistance can be provided to the service provider to facilitate successful completion. Alternatively, even if the prediction is for a successful outcome, recommendations can be made to expedite the servicing or perform additional servicing in an attempt to increase customer satisfaction.

Figure 1:
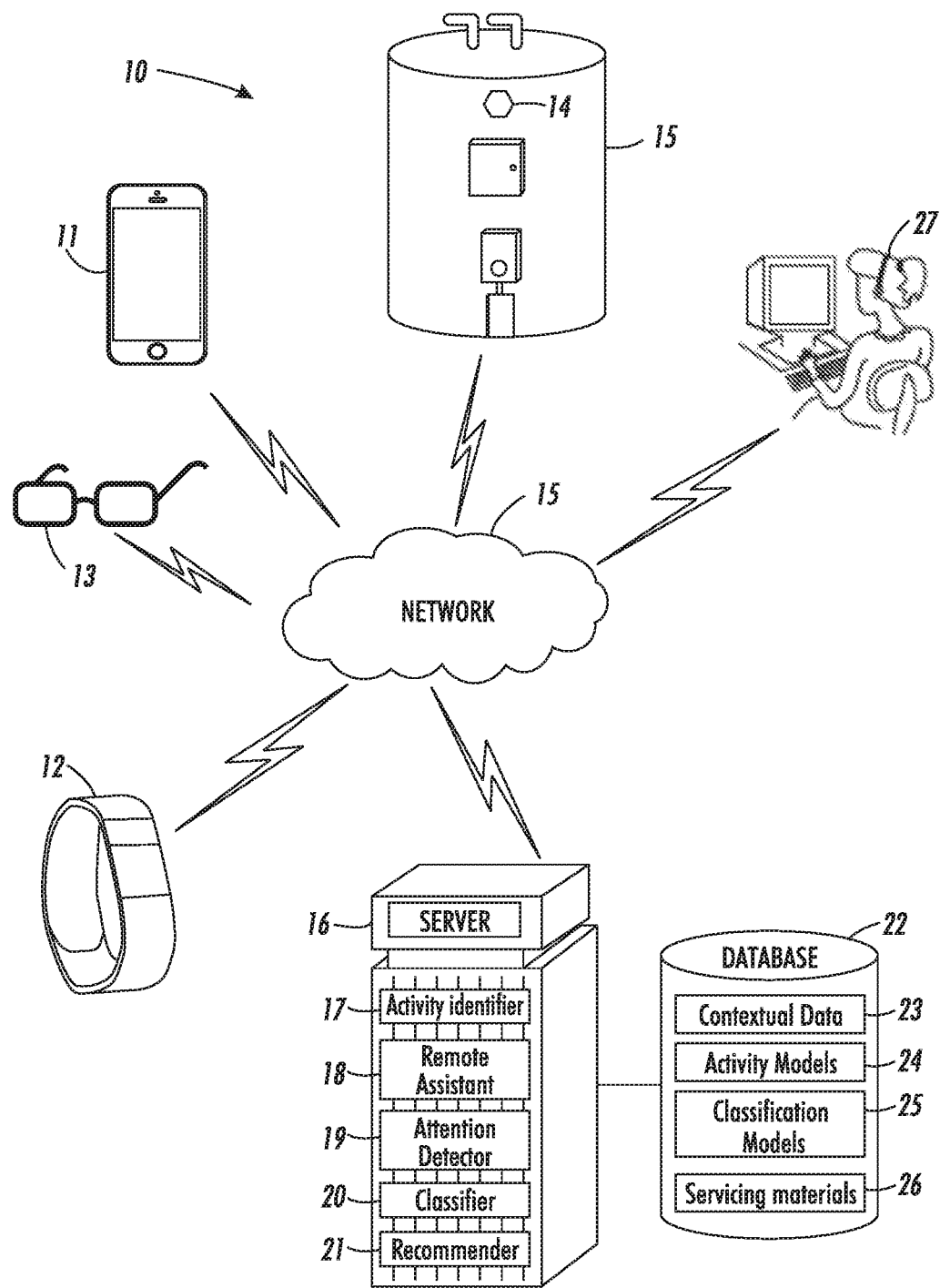
FIG. 1 is a block diagram showing a computer-implemented system for predicting activity outcome based on user attention, in accordance with one embodiment.

Determining whether a service will be successfully completed and providing necessary assistance to the service provider can maintain or reduce the amount of time needed to complete the service, which may eventually increase clientele. FIG. 1 is a block diagram showing a computer-implemented system 10 for predicting activity outcome based on user attention, in accordance with one embodiment. A customer (not shown) submits a request for a service. The service can be dependent on the type of company to which the request is submitted, such as repair companies, cable companies, cell phone companies, ridesharing businesses, and stores, as well as other businesses, and can include, inter alia, requests for machine repair and cable installation. Once received, the service request is assigned to a service provider for attention and completion.

The service provider or user, to whom the request is assigned, can be associated with one or more mobile computing devices, including a smartphone 11, a smart watch 12, and a head-mounted computing device 13, such as Google Glass manufactured by Google Inc. Hereinafter, the terms "service provider" and "user" are used interchangeably with the same intended meaning, unless otherwise indicated. Using one or more of the mobile computing devices, the service provider can access an application for activity determination and outcome prediction prior to performing the service associated with the request. During servicing, each of the computing devices can collect contextual data 23 for the service provider, including one or more of location, acceleration, movement tracking, inventory, and other types of data related to the user's current surroundings. The contextual data 23 can be collected via sensors, such as an accelerometer or GPS, within the computing devices, as well as cameras, video recorders, and voice recorders.

Once collected, the contextual data 23 can be separately transmitted from each of the computing devices 11-13 to a server 16 for storing in a database 22 interconnected to the server 16. The server 16 includes an activity identifier 17, a remote assistant 18, an attention detector 19, a classifier 20, and a recommender 21. The activity identifier 17 accesses the contextual data 23 to identify one or more activities of the user currently being performed during the servicing. In one embodiment, the activities can be identified using a combination of activity recognition and semantic modeling. Specifically, low level activities can be determined directly from the context data itself, while high level activities can be identified using activity models 24 based on one or more of the low level activities. Identifying activities is further described in detail with reference to FIG. 3. Once identified, the activities of the user can be stored in the database 22 in an activity log (not shown).

During the activity, helpful advice can be provided to the service provider, regardless of whether a need for assistance by the service provider is identified. The helpful advice can be provided as a recommendation by the recommender 21 or as remote assistance, which can be initiated via the remote assistant 18. For example, if a particular activity is being performed by the service provider for an unusually long amount of time, the service provider may need assistance to complete the activity. The recommendation can include servicing material 26, such as reference materials, training manuals, or step-by-step instructions, as well as helpful hints or tips, and examples, for completing the activity. The particular type of servicing material to be recommended can be based on the identified activity, as described in further detail in commonly-owned, U.S. Patent Application Publication No. 2018/0012229, pending, the disclosure of which is incorporated by reference.

Further, assistance can also be provided to a service provider or other individuals by identifying and notifying a group of individuals qualified to assist, as described in further detail in commonly-owned, U.S. Patent Application Publication No. 2018/0012170, pending, the disclosure of which is incorporated by reference. For instance, a user is identified as performing protein purification in which a hazardous chemical is used. The user is continually monitored throughout the purification process and further activities of the user are identified, including the user spilling the hazardous chemical. Based on the spill action, a recommendation is provided to the user to leave the room without cleaning the spill since the user is not experienced in cleaning chemical spills. Further, a group of individuals with knowledge and experience regarding proper chemical cleaning are identified and notified of the spill. One or more of the individuals can offer to or be selected to clean the spill.

Meanwhile, remote assistance, which is provided via the remote assistant 18 of the server 16, allows users to receive real-time assistance from experts and perform known procedures for resolving problems step-by-step under guidance of the expert. For instance, a need by the service provider is identified and an expert or other individual 27 with expertise in handling matters related to the need of the service provider is selected for connecting with the service provider. The connection can include an audio and video connection, such that the expert is able to obtain an understanding of the service provider's surroundings, including a view comparable to the service providers.

During the remote assistance, the computing devices 11-13 monitor the actions of the service provider and collect further contextual data 23 to determine outcome features. Using the outcome features, the attention detector 19 can determine a subject of focus of the service provider while performing the identified activity. In one embodiment, the outcome features include a distance of the service provider from a particular object 15 that is associated with a Bluetooth beacon 14, as well as a visual focus on an aspect of an object, person, or piece of content.

Subsequently, the classifier 20 utilizes the activity and subject of focus to provide a predicted outcome of the activity being performed by the user. Specifically, the classifier 20 uses outcome models 25 stored in the database 22 to classify whether the activity performed by service provider will be successfully completed based on the service provider's subject of focus. Based on the predicted outcome, the recommender 21 may provide a recommendation for completing the activity. For instance, the recommendation can include advice, as well as servicing materials 26, such as articles, manuals, training material, and step-by-step guidelines. Other types of information for providing with the recommendation are possible. The servicing material 26 can be stored in and accessed from the database 22. In a further embodiment, the recommendation can be provided to the expert for discussing with or instructing the service provider for successful completion of the activity during remote access.

The mobile computing devices 11-13 and server 16 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
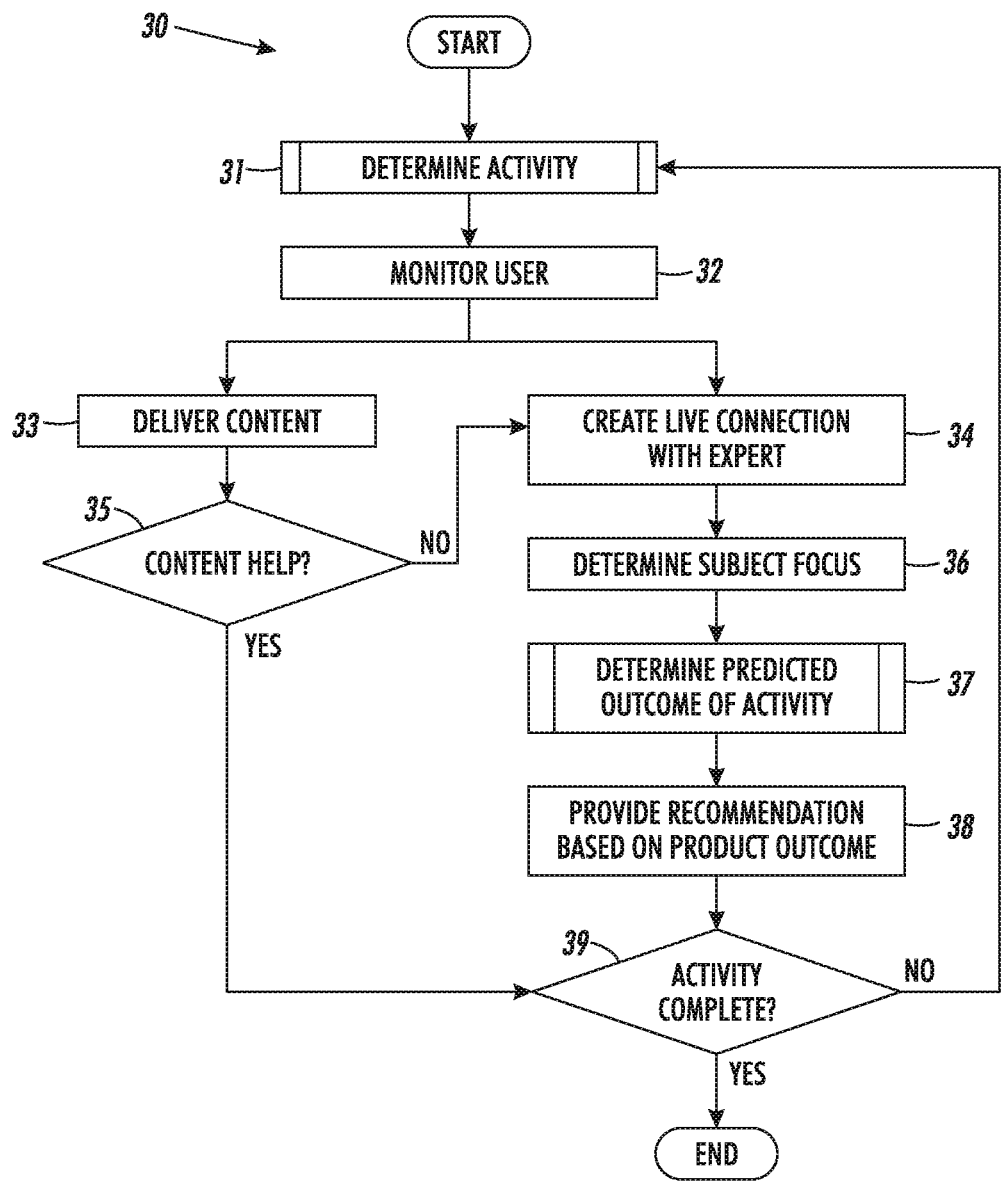
FIG. 2 is a flow diagram showing a computer-implemented method for predicting activity outcome based on user attention, in accordance with one embodiment.

Determining a subject of focus for a service provider can provide valuable knowledge regarding an outcome of an activity, which can be used to increase productivity of a company and customer satisfaction. FIG. 2 is a flow diagram showing a computer-implemented method 30 for predicting activity outcome based on user attention, in accordance with one embodiment. An activity being performed by a service provider during a servicing job is determined (block 31) and monitoring of the service provider commences (block 32). In one example, a customer of a cable company submits a service request for cable installation. The request is assigned to a service provider for completion and the service provider enters the customer's house to perform the installation. During the installation, an activity being performed by the service provider is determined, such as connecting a cable box to a newly installed jack.

Based on the activity, servicing materials can be delivered (block 33) to the service provider to assist with the cable box connection or alternatively, remote assistance can be performed (block 34) by the connecting the service provider with an expert for live assistance. If servicing material is sent to the service provider, a determination (block 35) is made as to whether the servicing material is helpful to the service provider or whether the service provider requires additional assistance. If the servicing material is helpful, and no further assistance is necessary, a determination (block 39) is made as to whether the activity has been completed and if so, no further monitoring of the service provider is required for that particular activity, but monitoring may continue until the service is completed. However, if the activity has not been completed, further monitoring of the service provider is performed (block 32).

When the service provider requires further assistance, in addition to the servicing material, or in lieu of the servicing material, remote assistance can be initiated (block 34) to connect the service provider with a live expert or individual with knowledge or expertise with the activity or need of the service provider. During remote assistance, contextual data of the service provider is obtained and used to determine a subject of focus (block 36). Subsequently, an outcome of the activity performed by the service provider can be predicted (block 37). The outcome can include a positive outcome, neutral outcome, or negative outcome with respect to completion of the activity. Making a prediction regarding activity completion is further described below with reference to FIG. 4.

Based on the predicted outcome, a relevant recommendation can be identified and provided (block 38) to the service provider to ensure that the service provider successfully completes the activity. The recommendation can include servicing material, such as reference materials, training manuals, or step-by-step instructions, as well as helpful hints or tips, and examples. The recommendation can be selected based on the activity being performed, the subject of focus of the service provider, and the predicted outcome of the activity. Finally, a determination (block 39) is made as to whether the activity has been successfully completed. If so, then the process ends and no further monitoring of the service provider is required since the service requested has been fulfilled. However, if further activities remain, the next activity is determined (block 31).

Returning to the above example regarding cable installation, the service provider is determined to be connecting the new cable box to the jack. The service provider is connected with a live expert who can see what the service provider is looking at while communicating verbally with the service provider. Contextual data of the service provider is collected during the interaction and used to determine one or more outcome factors for predicting whether the cable box will be properly connected to the jack. Subsequently, a recommendation can be provided to further assist the service provider with the connection when the outcome is unsuccessful, such as by step-to-step instructions, a video showing a cable box connection, or an example. However, if the outcome is predicted to be successful, the recommendation can include a request that the service provider perform an additional activity to please the customer or a reminder for the service provider to set the settings for the cable box.

Figure 3:
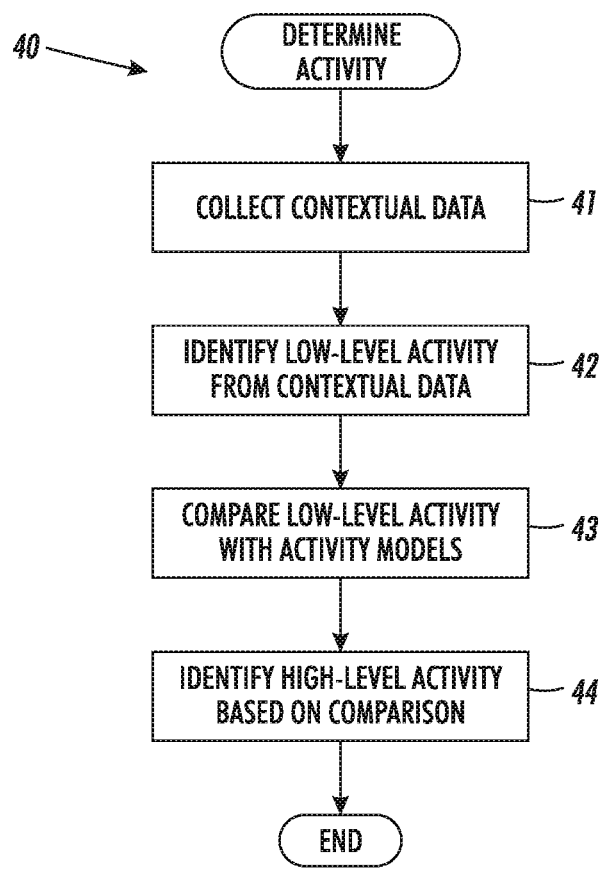
FIG. 3 is a flow diagram showing, by way of example, a process for determining a user activity.

To determine an outcome of an activity, the activity must first be identified. Monitoring and determining a user's activities helps anticipate a need of the user in real-time for providing relevant assistance and resolution, as described in commonly-owned, U.S. Patent Application Publication No. 2018/0012229, pending, the disclosure of which is incorporated by reference. Identifying such activities can be performed based on data collected about the user's surroundings. FIG. 3 is a flow diagram showing, by way of example, a process 40 for determining a user activity. Contextual data is collected (block 41) from sensors encompassed by mobile computing devices associated with the user. The mobile devices can include one or more of a smart phone, smart watch, and head-mounted computing device, as well as other types of mobile computing devices. Each of the mobile devices can include multiple sensors to measure contextual data, including speed, location, acceleration, physical movement, eye gaze, object presence, inventory, scenery, and traffic. Further, video, photo, and audio data can be collected using a video recorder, camera, and audio recorder, respectively.

One or more low-level activities being performed by the user can be identified (block 42) directly from the contextual data. Each low-level activity describes a raw action being performed by the user. For instance, if an accelerometer provides a reading of zero, then the user is determined to be still, and not accelerating or moving to a different location. However, a different sensor may identify movement of the user's finger by the pressing of a button on one of the mobile devices. The low-level activities are then compared (block 43) with a set of activity models to determine (block 44) a high-level activity of the model. A high-level activity describes a specific action being performed by the user based on the raw actions detected. For instance, returning to the example above, the user is determined to be still, but moving a finger with respect to the mobile device button selection, which may indicate some sort of work being conducted on the mobile device. Combined with data for tracking computer use, the user activity is determined to be pressing send on an email.

In one embodiment, each high-level activity can be stored as a model that includes one or more raw actions, or low-level activities, to identify that specific high-level activity. Those models that most closely resemble the detected raw actions of the user are identified and selected as the high-level activity identified as being performed by the user. Each activity model can be focused on the specific user based on actions performed by that user over time, as well as on background information regarding the user's job title and skill set. Alternatively, the activity models can be based on a population of users with the same or similar job titles and skills as the user. In one embodiment, the low-level activities can each be detected by the mobile devices associated with the user, while the high-level activities can be determined by a remote server using the activity models.

In a further embodiment, distributed activity detection can be used to identify activities performed by the user. Distributed activity detection helps offset some of the processing typically required by a server and can result in faster and more accurate identification of an activity using high frequency data. First, contextual data is collected for a user via one or more mobile computing devices. Features are extracted from the data to generate a feature vector. The feature vector is then compared with one or more activity models stored on at least one of the mobile computing devices and a similarity measure is determined for each model. If one of the models satisfies a predefined amount of similarity to the feature vector, an identification label for the activity associated with that model is assigned to the feature vector. However, if none of the models satisfy the similarity, the user is requested to assign an activity label to the activity represented by the feature vector and the activity label is transmitted to a server with the feature vector for training a new model. Once trained, the server transmits the new model to the mobile computing device for running. Distributed activity detection is described in further detail in commonly-owned, U.S. Patent Application Publication No. 2018/0013843, pending, the disclosure of which is incorporated by reference.

Figure 4:
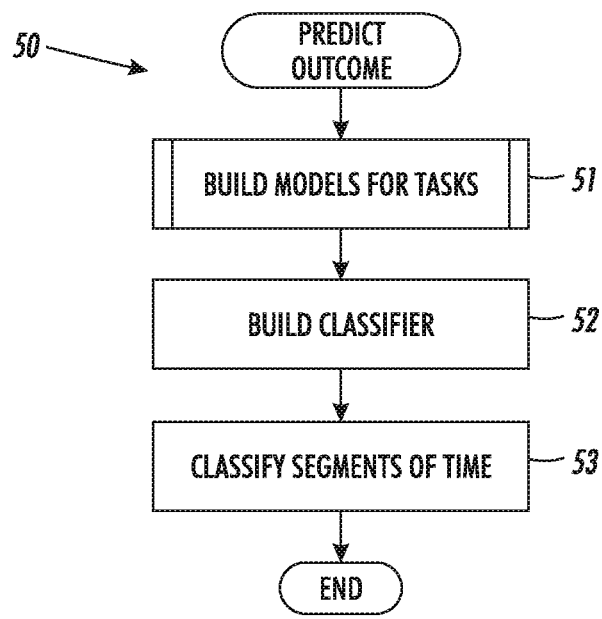
FIG. 4 is a flow diagram showing, by way of example, a process for predicting the outcome of a user activity.

Upon determining an activity of the service provider, an outcome of that activity can be determined based on a subject of focus of the service provider during the activity. FIG. 4 is a flow diagram showing, by way of example, a process 50 for predicting the outcome of a user activity. One or more outcome models are built (block 51) for each different type of activity. Each outcome model can include a name of the activity represented along with a list of outcome features, which can be determined from the contextual data collected via one or more mobile computing devices associated with the service provider. The outcome features can include a distance from a user to a known object, a visual focus on an aspect of an object, a visual focus on a person, a focus on a piece of content, the current activity, an average time to complete the activity, and a rating for an outcome of the activity based on the other outcome features.

The distance of a service provider from a known object can be identified using Bluetooth beacons. For example, a Bluetooth beacon can be placed on one or more pieces of equipment or machinery, such as a hot water heater for installation. When the service provider, who is associated with at least one mobile computing device with Bluetooth capability, enters a particular range of the Bluetooth beacon on the hot water heater, the computing device can determine that the service provider is in immediate proximity to the hot water heater. The visual focus of an aspect of the object can be identified using a camera on at least one of the mobile computing device associated with the service provider, such as a mobile headset or smart glasses. Video data or photographs captured by the camera can be used to identify an object at which the service provider is looking or focusing on. For instance, video data collected from a pair of smart glasses worn by the service provider identify that the service provider is looking at a front panel of the hot water heater.

Additionally, the visual focus of a person by the service provider can also be determined using video data, photographs, or audio data to determine whether the service provider is speaking to and facing another person with whom a conversation is occurring. Further, a service provider's focus on a piece of content, such as a step within the activity or other procedure, can be determined using a combination of data, such as video data photographs, audio data, and at least one procedure outline, which can include training guidelines, step-by-step instructions, or a list of activities to be performed for the activity.

Figure 5:
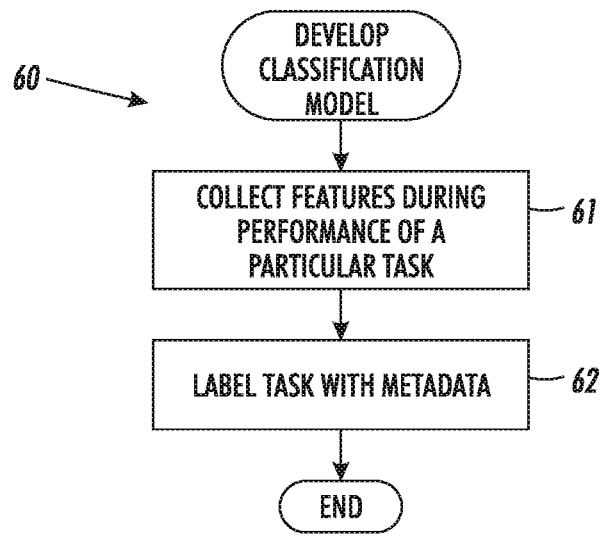
FIG. 5 is a flow diagram showing, by way of example, a process for developing an outcome classification model.

The outcome models can each be generated from the data collected for the outcome features. FIG. 5 is a flow diagram showing, by way of example, a process 60 for developing an outcome classification model. Data for one or more outcome features are collected (block 61) during a time period in which a user is performing a known activity. The outcome features include a distance from a user to a known object, a visual focus on an aspect of an object, a visual focus on a person, a focus on a piece of content, and the current activity. However, other outcome features are possible. Domain experts then label (block 62) the features from the time period with a name of the activity being performed while the features were collected, an average time to complete the activity being performed, and a rating for an outcome of the activity. The outcome rating can include successfully completed or not completed, as well as a range of values with one end of the range highly successful and the other end, not successful. The models can then be used to help identify qualities and techniques of the most effective service providers and those techniques can be used to help other service providers to become effective, such as via a recommendation.

Returning to the discussion with respect to FIG. 4, once the models have been generated, a classifier is built (block 52) based on the models. The classifier then classifies (block 53) activities with a predicted outcome for completion. For example, standard installation of a hot water heater takes on average 2.5 hours to complete. The service provider performing the installation is equipped with an installation guideline, which briefly lists steps of activities to be performed during the installation. Specifically, the guideline includes three main steps: remove the old hot water heater, position the new heater in place, and connect the new heater. Under each of the three main steps are sub-steps. Removing the old hot water heater includes disconnecting a power source to the old hot water heater, draining a tank of the old hot water heater, disconnecting water supply lines to the old heater, and physical removal of the old heater. Positioning the new heater in place includes bringing the new heater to the correct location, removing the new heater from the packing, if any, and maneuvering the new heater into the proper location. Finally, connecting the new heater includes connecting the new heater to the water supply lines and connecting the new heater to the power supply source, and adjusting the settings on the new heater.

Based on the data collected from the mobile computing devices associated with the service provider, the service provider is determined to be performing the step of disconnecting of the water supply lines to the old heater. Based on the outcome model for installing a hot water heater, five minutes of visual focus on the water supply wires is associated with a successful outcome. However, if a service provider receives a telephone call and steps away from the water supply wires prior to the completion of the five minutes, a distraction can be detected that they lead to an unsuccessful outcome. In one embodiment, a recommendation, such as a reminder to focus on the water supply wires, can be sent to the service provider. Conversely, focus of the service provider on a particular part of the new hot water heater during installation, such as the drain valve, can be associated with unsuccessful performance of the installation since the drain valve is not generally relevant to actual installation of the heater.

In a further embodiment, the outcome model can represent the action of disconnecting the water lines and an outcome of the action could be predicted based on the outcome features determined. Each time the service provider performs another step of the installation, a new outcome model can be applied and the outcome of the installation activity can be revised.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for predicting activity outcome based on user attention, comprising:
   sensor data collected for a user; and
   a server comprising a central processing unit, an input port to receive the sensor data, and an output port, wherein the central processing unit is configured to:
     identify an activity performed by a user based on the sensor data;
     collect features of the user while performing the activity via one of determine a distance of the user from a known object, determine a visual focus on an object, determine a visual focus on a person, and determine a focus on a piece of content;
     determine a subject on which the user is focused based on the collected features; and
     predict whether the activity will be successfully completed by the user based on the features and the determined subject on which the user is focused while the activity is being performed by the user, comprising:
       identify a model matching the identified activity; and
       assign a predicted outcome from the model matching the identified activity.

2. A system according to claim 1, wherein the central processing unit is further configured to:
   select one or more references for the user based on the activity performed;
   provide the selected references to the user.

3. A system according to claim 1, wherein the central processing unit is further configured to:
   connect the user with an expert during performance of the activity.

4. A system according to claim 1, wherein the central processing unit is further configured to:
   determine the activity by collecting contextual data of the user, identifying at least one low-level activity from the contextual data, comparing the identified low-level activities with activity models, wherein each activity model is associated with an activity, and selecting the activity associated with the activity model with the highest similarity to the identified low-level activities.

5. A system according to claim 1, wherein the central processing unit is further configured to:
   determine a recommendation for the user regarding completion of the activity based on the subject of focus; and
   provide the recommendation to the user.

6. A system according to claim 1, wherein the central processing unit is further configured to:
   detect a period of distraction of the user from performing the activity based on the features and the subject of focus.

7. A system according to claim 1, wherein the central processing unit is further configured to:
   monitor a beacon on one or more pieces of equipment; and
   determine the distance of the user from at least one of the equipment pieces based on the beacon.

8. A computer-implemented method for predicting activity outcome based on user attention, comprising:
   identifying an activity performed by a user;
   collecting features of the user while performing the activity, wherein collecting the features comprises one or more of:
     determining a distance of the user from a known object;
     determining a visual focus on an object;
     determining a visual focus on a person; and
     determining a focus on a piece of content;
   determining a subject on which the user is focused based on the collected features; and
   predicting whether the activity performed by the user will be successfully completed by the user based on the features and the determined subject on which the user is focused while the activity is being performed by the user comprising:
     identifying a model matching the identified activity; and
     assigning a predicted outcome from the model that matches the identified activity.

9. A method according to claim 8, further comprising:
   selecting one or more references for the user based on the activity performed;
   providing the selected references to the user.

10. A method according to claim 8, further comprising:
    connecting the user with an expert during performance of the activity.

11. A method according to claim 8, further comprising:
    determining the activity, comprising:
      collecting contextual data of the user;
      identifying at least one low-level activity from the contextual data;
      comparing the identified low-level activities with activity models, wherein each activity model is associated with an activity; and
      selecting the activity associated with the activity model with the highest similarity to the identified low-level activities.

12. A method according to claim 8, further comprising:
    determining a recommendation for the user regarding completion of the activity based on the subject of focus; and
    providing the recommendation to the user.

13. A method according to claim 8, further comprising:
    detecting a period of distraction of the user from performing the activity based on the features and the subject of focus.

14. A method according to claim 8, further comprising:
    monitoring a beacon on one or more pieces of equipment; and
    determining the distance of the user from at least one of the equipment pieces based on the beacon.

* * * * *